United States Patent
Kim et al.

(10) Patent No.: US 10,618,372 B2
(45) Date of Patent: Apr. 14, 2020

(54) HEAT EXCHANGER FOR VEHICLE

(71) Applicants: Hyundai Motor Company, Seoul (KR); Kia Motors Corporation, Seoul (KR); Hanon Systems, Daejeon (KR)

(72) Inventors: Jae Yeon Kim, Gyeonggi-do (KR); Dong Seok Oh, Gyeonggi-do (KR); Wan Je Cho, Gyeonggi-do (KR); Hyun Keun Shin, Daejeon (KR); Sangyong Rhee, Daejeon (KR)

(73) Assignees: Hyundai Motor Company, Seoul (KR); Kia Motors Corporation, Seoul (KR); Hanon Systems, Daejeon (KR)

( * ) Notice: Subject to any disclaimer, the term of this patent is extended or adjusted under 35 U.S.C. 154(b) by 101 days.

(21) Appl. No.: 15/948,054

(22) Filed: Apr. 9, 2018

(65) Prior Publication Data

US 2019/0160908 A1    May 30, 2019

(30) Foreign Application Priority Data

Nov. 28, 2017    (KR) ........................ 10-2017-0160591

(51) Int. Cl.
| | |
|---|---|
| *B60H 1/00* | (2006.01) |
| *F25B 41/06* | (2006.01) |
| *F28D 9/00* | (2006.01) |
| *F28F 9/00* | (2006.01) |

(Continued)

(52) U.S. Cl.
CPC ..... *B60H 1/00335* (2013.01); *B60H 1/00342* (2013.01); *F25B 41/062* (2013.01); *F28D 9/005* (2013.01); *F28F 3/044* (2013.01); *F28F 9/002* (2013.01); *F28F 9/0253* (2013.01); *B60H 1/00485* (2013.01); *F25B 2500/12* (2013.01); *F25B 2500/13* (2013.01); *F25B 2500/18* (2013.01); *F25B 2500/221* (2013.01)

(58) Field of Classification Search
CPC .......... B60H 1/00342; F25B 2400/054; F25B 2500/12; F25B 2500/13; F28F 3/08
See application file for complete search history.

(56) References Cited

U.S. PATENT DOCUMENTS

| | | | |
|---|---|---|---|
| 6,918,434 B2 * | 7/2005 | Strahle | F28D 9/005 165/167 |
| 7,089,760 B2 * | 8/2006 | Ichimura | B60H 1/00571 62/513 |

(Continued)

*Primary Examiner* — Nelson J Nieves
(74) *Attorney, Agent, or Firm* — Mintz Levin Cohn Ferris Glovsky and Popeo, P.C.; Peter F. Corless (57) ABSTRACT

A vehicle heat exchanger is disclosed that includes a heat exchange unit having first and second plates layered to alternately form a first and second flow path. Operation fluids passing through the paths exchange heat. A first inflow aperture is formed on a second surface of the unit and connected to the first flow path. A first exhaust aperture is formed corresponding to the first inflow aperture on the first surface of the unit and connected to the first flow path. A connection aperture is formed in the plates, connected to the first flow path, and closing a connection to the second flow path. A second inflow aperture is formed corresponding to the first inflow aperture and connected to the second flow path. A second exhaust aperture is formed at a center of the unit and connected to the second inflow aperture through the second flow path.

18 Claims, 9 Drawing Sheets

(51) Int. Cl.
*F28F 9/02* (2006.01)
*F28F 3/04* (2006.01)

(56) References Cited

U.S. PATENT DOCUMENTS

| | | | |
|---|---|---|---|
| 7,600,559 B2* | 10/2009 | Strahle | F28D 9/0012 165/167 |
| 2001/0020786 A1* | 9/2001 | Takamatsu | F16L 39/005 285/123.1 |
| 2010/0230082 A1* | 9/2010 | Patel | B21D 15/02 165/177 |
| 2010/0243200 A1 | 9/2010 | Baker, Jr. et al. | |
| 2011/0088968 A1 | 4/2011 | Kempf et al. | |
| 2012/0055195 A1* | 3/2012 | Wolfe, IV | F25B 40/00 62/513 |
| 2012/0097365 A1* | 4/2012 | Papoulis | F28D 9/005 165/61 |
| 2013/0292090 A1* | 11/2013 | Haussmann | F28D 9/005 165/96 |
| 2014/0290921 A1* | 10/2014 | Ito | F28F 3/046 165/166 |
| 2015/0276328 A1* | 10/2015 | Huang | F25B 40/00 165/164 |
| 2015/0323266 A1* | 11/2015 | Bardeleben | F28F 3/025 165/76 |
| 2016/0161192 A1* | 6/2016 | Kim | F25B 40/00 165/167 |
| 2017/0176065 A1* | 6/2017 | Kuroda | F28F 3/08 |
| 2018/0080693 A1* | 3/2018 | Wang | H01M 10/613 |
| 2018/0087848 A1* | 3/2018 | Ogata | F25B 1/00 |
| 2018/0327920 A1* | 11/2018 | Tajiri | F28D 1/0246 |
| 2019/0162111 A1* | 5/2019 | Rossignol | F02M 35/10268 |

\* cited by examiner

HEAT EXCHANGER FOR VEHICLE

CROSS-REFERENCE TO RELATED APPLICATION

This application claims priority to and the benefit of Korean Patent Application No. 10-2017-0160591 filed in the Korean Intellectual Property Office on Nov. 28, 2017, the entire contents of which are incorporated herein by reference.

BACKGROUND

(a) Field of the Invention

The present invention relates to a heat exchanger for a vehicle, and more particularly, to a heat exchanger for a vehicle that is mounted in an integral form in an expansion valve and that improves air conditioning performance by super-cooling a refrigerant supplied from a condenser with a refrigerant supplied from an evaporator to a compressor through mutual heat exchange, and that reduces noise and vibration occurring when a refrigerant moves.

(b) Description of the Related Art

In general, an air conditioner system of a vehicle maintains a comfortable indoor environment by maintaining a vehicle indoor temperature at an appropriate temperature regardless of a temperature change outside the vehicle. Such an air conditioner system includes a compressor that compresses a refrigerant, a condenser that condenses and liquefies the refrigerant that is compressed in the compressor, an expansion valve that rapidly expands the refrigerant that is condensed and liquefied in the condenser, and an evaporator that cools air that is guided to an interior in which the air conditioner system is installed using evaporation latent heat of the refrigerant while evaporating the refrigerant that is expanded in the expansion valve.

The air conditioner system operates according to a general freezing cycle, and performs an air conditioning process by a continuous phase change from a liquid state of a high temperature and a high pressure to a gas state of a low temperature and a low pressure while sequentially repeatedly circulating a refrigerant through an air conditioner pipe that connects the compressor, the condenser, the expansion valve, and the evaporator. However, the conventional air conditioner system has a structure that again super-cools a refrigerant that is condensed in a condenser and thus, a pressure drop frequently occurs at the inside of a condenser inlet and outlet pipe due to a complex refrigerant flow.

Further, since the condenser is formed in a limited size and internal space of an engine compartment is restricted, there is a limitation in a length of an air conditioner pipe in which a refrigerant moves and thus, a minimum required length for reducing a refrigerant to a necessary temperature is not satisfied and a Coefficient Of Performance (COP), which is a coefficient of air conditioning ability to compressor power consumption is thus reduced, and thus the overall air conditioning performance and efficiency of the air conditioner system are deteriorated. Additionally, a refrigerant that circulates through the air conditioner system is compressed at a high temperature and a high pressure through the compressor to be moved in an air conditioner pipe at a rapid speed, and thus noise and vibration occur in the air conditioner pipe, and due to such noise and vibration, overall noise, vibration, and harshness (NVH) performance of the vehicle is deteriorated.

The above information disclosed in this section is merely for enhancement of understanding of the background of the invention and therefore it may contain information that does not form the prior art that is already known in this country to a person of ordinary skill in the art.

SUMMARY

The present invention provides a heat exchanger for a vehicle having advantages of being mounted in an integral form in an expansion valve to improve air conditioning performance of an air conditioner system by super-cooling a refrigerant of a high temperature and a high pressure that is supplied from a condenser with a refrigerant of a low temperature and a low pressure that is supplied from an evaporator to a compressor through mutual heat exchange, and to improve an NVH performance of the vehicle by reducing noise and vibration occurring when a refrigerant moves.

A heat exchanger for a vehicle according to an exemplary embodiment of the present invention may include a heat exchange unit in which a plurality of first and second plates are alternately layered to alternately form a first flow path and a second flow path inside the unit, operation fluids passing through each of the first and second flow paths exchange heat, and a first surface is connected to an expansion valve; a first inflow aperture formed at a first side corner portion on a second surface of the heat exchange unit and connected to the first flow path; a first exhaust aperture formed corresponding to the first inflow aperture on the first surface of the heat exchange unit and connected to the first flow path; a connection aperture respectively formed in the first and second plate at positions facing the first inflow aperture and the first exhaust aperture, connected to the first flow path inside the heat exchange unit, and closing a connection to the second flow path; a second inflow aperture formed corresponding to the first inflow aperture at a second side corner portion of the heat exchange unit and connected to the second flow path; and a second exhaust aperture formed at a center of the heat exchange unit and connected to the second inflow aperture through the second flow path, wherein at least one noise reduction unit reducing noise and vibration generated from the operation fluid moving through the second inflow aperture and the second exhaust aperture is mounted to the first surface or the second surface of the heat exchange unit.

The first plate may include a first main body in which at least one protrusion extending inside the first flow path is formed on a first surface, and the second exhaust aperture and the connection aperture are formed; and a first extension part having the first inflow aperture and formed extending toward a width direction of the expansion valve from the first main body. The second plate may include a second main body in which at least one protrusion extending inside the second flow path is formed on the first surface, and the second exhaust aperture and the connection aperture are formed; and a second extension part having the second inflow aperture and formed extending toward the width direction of the expansion valve from the second main body, and a notching aperture may be formed at a position that corresponds to the second exhaust aperture at the second plate mutually coupled to form the second flow path to communicate the second flow path and the second exhaust aperture.

The first extension part and the second extension part may respectively extend from the first and second main body and are positioned to be crossed to each other. The connection aperture may be formed to be separated from the second exhaust aperture at an opposite side of the first and second extension part on the first and second main body and is formed in a slot shape. The noise reduction unit may include a first noise reduction unit mounted at the second surface of the heat exchange unit, and the first noise reduction unit may include a muffler body in which a center part is formed in a cylindrical shape with reference to a length direction, and first and second mounting parts having a diameter less than the diameter of the center part from the center part toward both ends are formed in a conical shape.

A mounting plate formed of the same external shape as the shape of the heat exchanger may be mounted on the first mounting part through a coking and brazing welding. The mounting plate may be mounted on the second surface of the heat exchange unit through a brazing welding to connect the first mounting part to the second exhaust aperture. A penetration aperture that corresponds to the first inflow aperture may be formed in the mounting plate. A pipe block used to mount a connection pipe may be respectively formed on the second mounting part and the penetration aperture. The first noise reduction unit may be an expansion muffler.

The noise reduction unit may include a second noise reduction unit mounted between the expansion valve and the heat exchange unit, and the second noise reduction unit may include a noise reduction plate including at least two sheets to be mutually coupled and forming a space inside; and a resonance aperture formed to correspond to the second exhaust aperture on the center of the noise reduction plate and connected to the space. First and second protruded parts may be integrally formed corresponding to the first and second inflow apertures at the noise reduction plate.

The second noise reduction unit may be formed of the same external shape as the heat exchange unit and may be mounted on the heat exchange unit through a brazing welding. The space may close the connection to the first flow path, the first inflow aperture, and the first exhaust aperture so that the operation fluid exhausted to the second exhaust aperture after inflowing to the second inflow aperture and passing through the second flow paths only flows in through the resonance aperture. The second noise reduction unit may be a resonance muffler. The connection plate may be mounted on the expansion valve by a fixing bolt.

Additionally, a seal ring may be interposed between the connection plate and the expansion valve to prevent a leakage of the operation fluid that flows into the expansion valve from the heat exchange unit or flows into the heat exchange unit from the expansion valve. The heat exchange unit or the noise reduction unit may be mounted on the connection plate through the coking and brazing welding in the opposite direction of the expansion valve. The operation fluid may be formed with a refrigerant of a high temperature and a high pressure that is discharged from a condenser to pass through each first flow channel through the first inflow aperture, and a refrigerant of a low temperature and a low pressure that is discharged from an evaporator to pass through each second flow channel through the second inflow aperture.

As above-described, the heat exchanger for the vehicle an exemplary embodiment of the present invention is integrally mounted on the expansion valve and super-cools the refrigerant of the high temperature and the high pressure supplied from the condenser with the refrigerant of the low temperature and the low pressure supplied from the evaporator through mutual heat exchange, thereby improving air conditioning performance of an air conditioner system and simplifying refrigerant flow, and thus occurrence of pressure drop within a condenser inlet and outlet pipe may be reduced.

Further, by super-cooling a refrigerant and supplying the refrigerant to the evaporator, a refrigerant temperature of the inlet side of the evaporator may be additionally decreased and an enthalpy difference of the evaporator is largely formed and thus a COP, which is a coefficient of an air conditioning ability to consume power of the compressor may be maximized. Accordingly, compared with a conventional case, an air conditioning performance and air conditioning efficiency of an entire air conditioner system may be improved.

By reducing noise and vibration from occurring when the refrigerant moves by integrally forming one or all the first and second noise reduction units, noise and vibration is prevented from being transferred to a vehicle interior, and an entire NVH performance of a vehicle is improved such that a driving impression and entire marketability of a vehicle may be improved. Additionally, by forming the heat exchanger along the noise reduction unit in a module by integrally forming it in the expansion valve, constituent elements may be formed in a simplified manner and thus a production cost may be reduced. By simplifying a layout within a small engine compartment by reducing a length of an air conditioner pipe, space use may be improved.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

DESCRIPTION OF SYMBOLS

100: heat exchanger
110: heat exchange unit 112, 114: first and second plate
112a, 114a: first and second main body
112b, 114b: first and second extension part
112c, 114c: protrusion
114d: notching aperture
116a, 116b: first and second flow path
118a, 122a: first and second inflow aperture
118b, 122b: first and second exhaust aperture
124: connection aperture
130: connection plate
132: seal ring
160, 170: first and second noise reduction unit
162: muffler body
164: center part
166, 168: first and second mounting part
169: pipe block
172: noise reduction plate
174: resonance aperture
176, 178: first and second protruded part

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

An exemplary embodiment of the present invention will hereinafter be described in detail with reference to the accompanying drawings. While the invention will be described in conjunction with an exemplary embodiment, it will be understood that present description is not intended to limit the invention to those exemplary embodiments. On the contrary, the invention is intended to cover not only the exemplary embodiment, but also various alternatives, modifications, equivalents and other embodiments, which may be included within the spirit and scope of the invention as defined by the appended claims.

Components unrelated to the description will be omitted in order to obviously describe the present invention, and like reference numerals will be used to describe like components throughout the present specification. Further, in the drawings, the sizes and the thicknesses of the components are exemplarily provided for the convenience of description, the present invention is not limited those shown in the drawings, and the thicknesses are exaggerated to clearly show several parts and regions.

Figure 1:
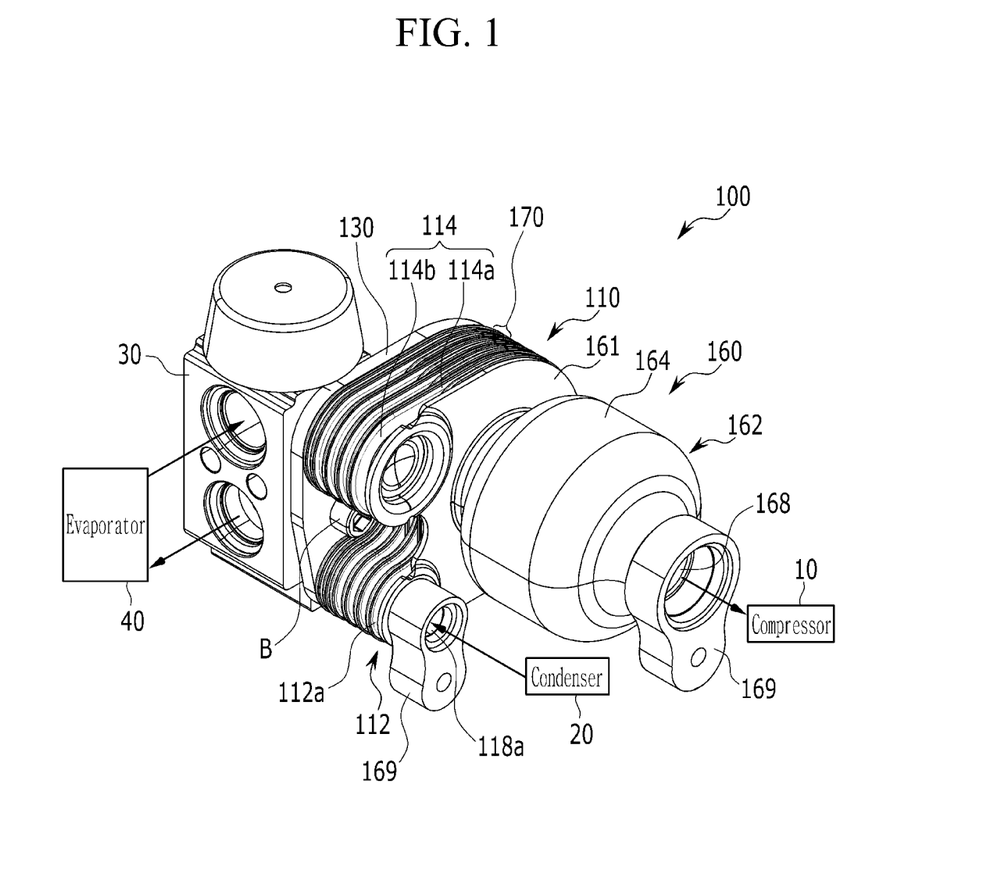
FIG. 1 is a perspective view illustrating a heat exchanger for a vehicle according to a first exemplary embodiment of the present invention.
Figure 2:
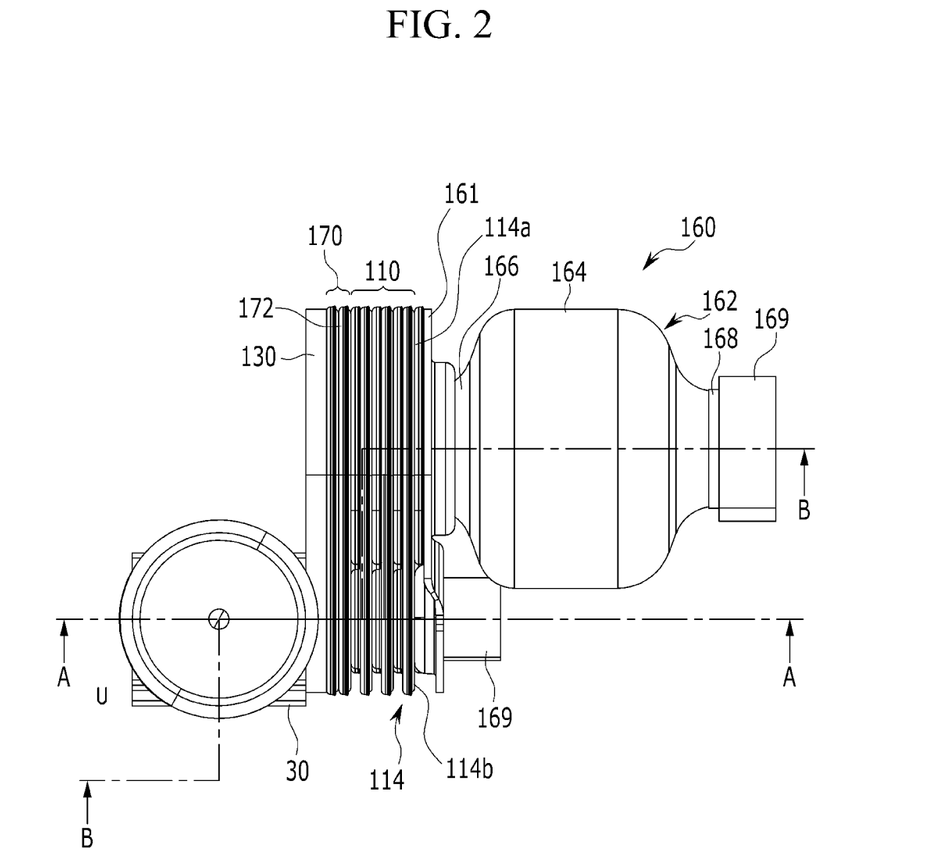
FIG. 2 is a top plan view of a heat exchanger for a vehicle according to an exemplary embodiment of the present invention.
Figure 3:
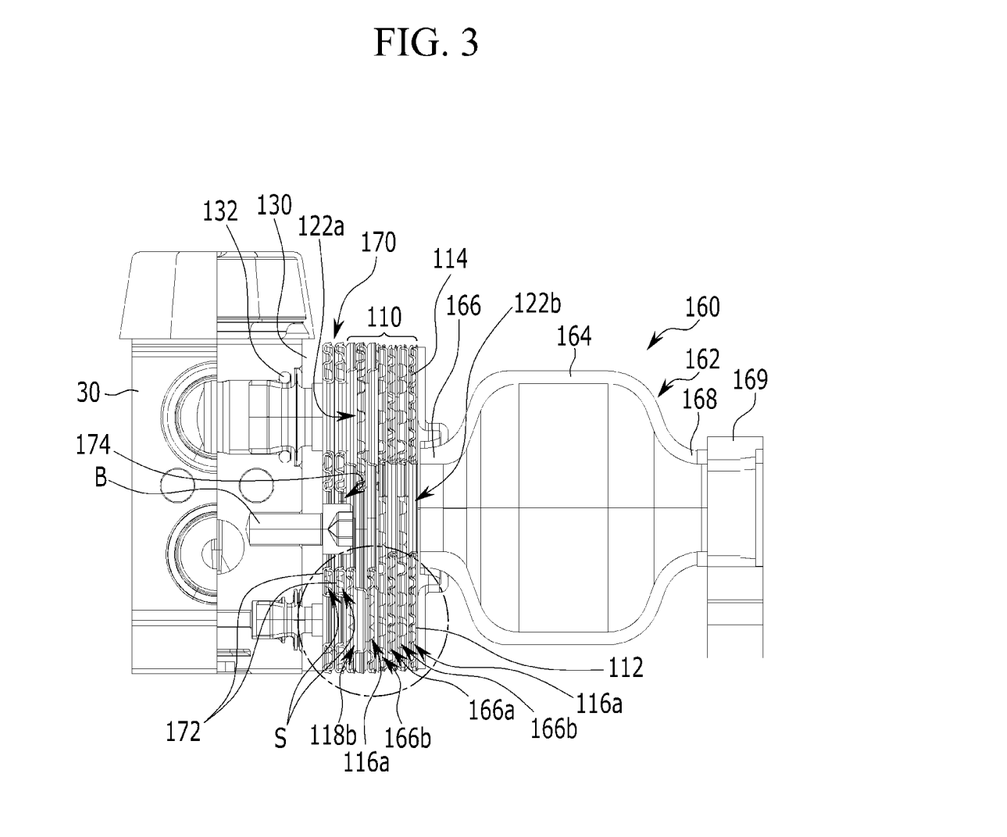
FIG. 3 is a cross-sectional view of a heat exchanger for a vehicle according to an exemplary embodiment of the present invention.
Figure 4:
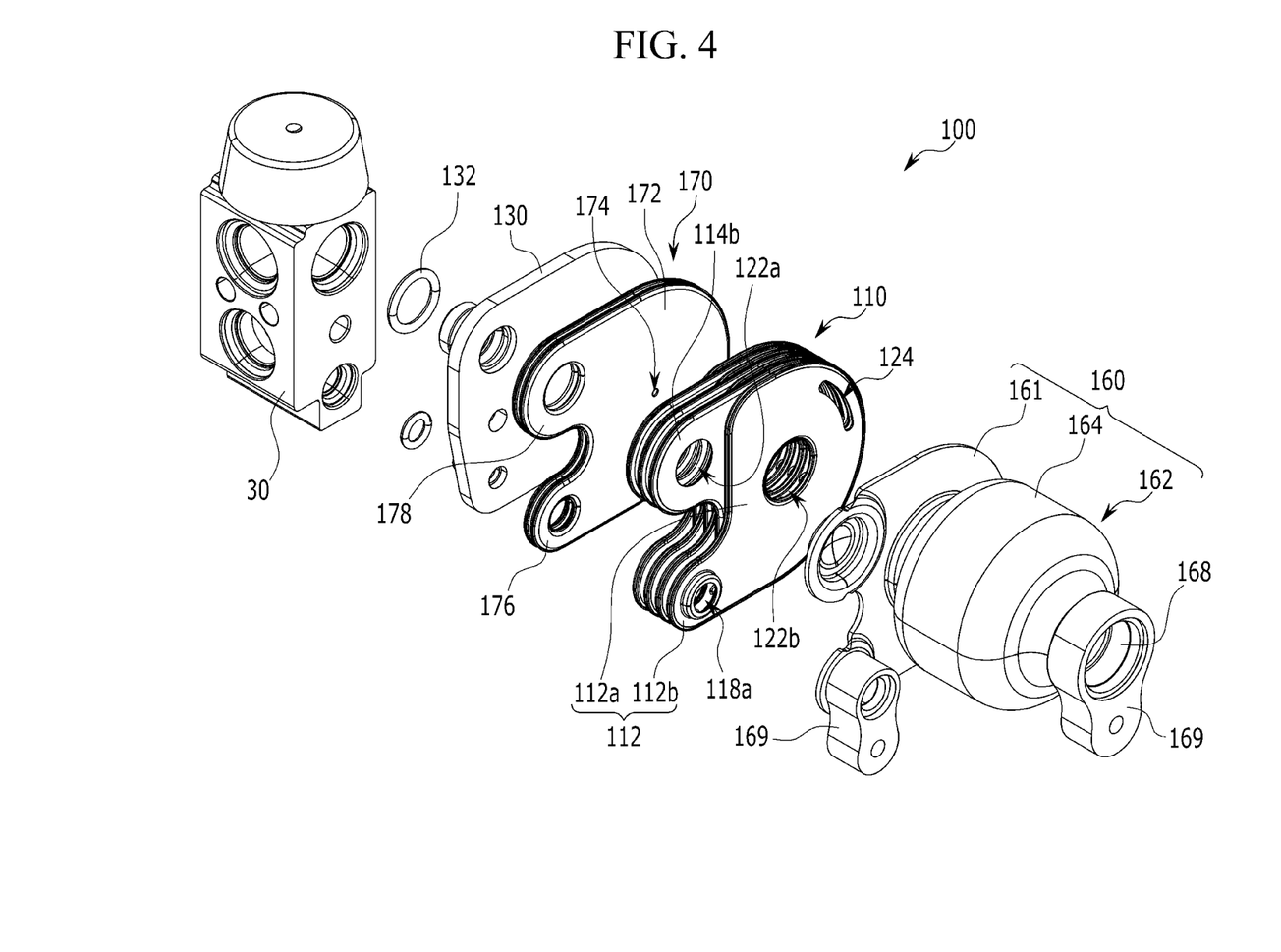
FIG. 4 and FIG. 5 are detailed perspective views of a heat exchanger for a vehicle according to an exemplary embodiment of the present invention.
Figure 5:
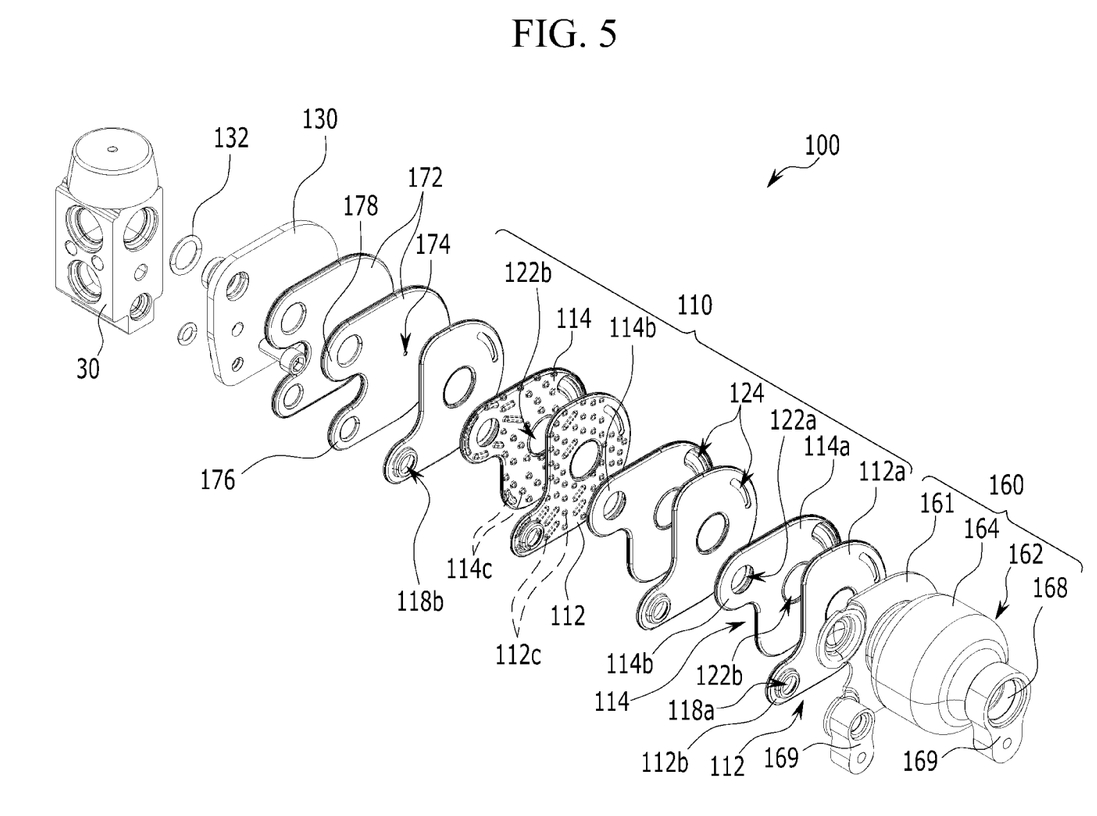
Figure 6:
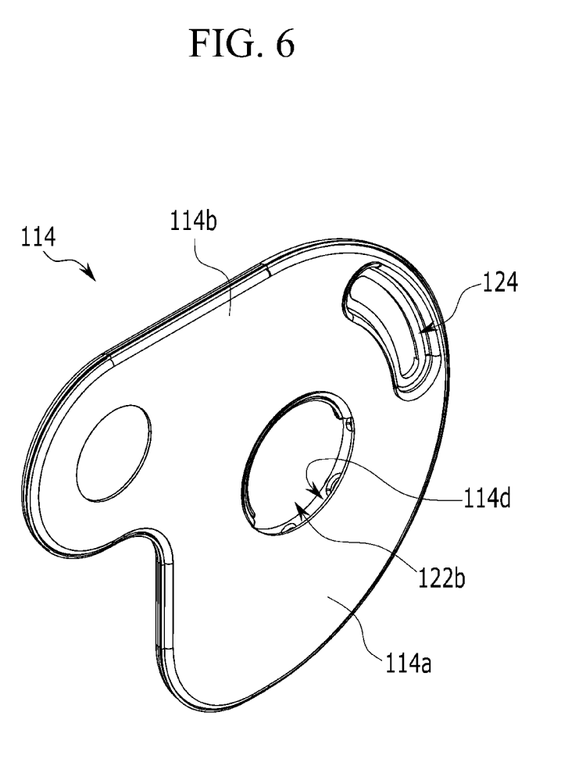
FIG. 6 is a perspective view of a mutually coupled second plate in a heat exchanger for a vehicle according to an exemplary embodiment of the present invention.

FIG. 1 is a perspective view illustrating a heat exchanger for a vehicle according to a first exemplary embodiment of the present invention, FIG. 2 is a top plan view of a heat exchanger for a vehicle according to an exemplary embodiment of the present invention, FIG. 3 is a cross-sectional view of a heat exchanger for a vehicle according to an exemplary embodiment of the present invention, FIG. 4 and FIG. 5 are detailed perspective views of a heat exchanger for a vehicle according to an exemplary embodiment of the present invention, and FIG. 6 is a perspective view of a mutually coupled second plate in a heat exchanger for a vehicle according to an exemplary embodiment of the present invention.

A heat exchanger 100 for a vehicle according to an exemplary embodiment of the present invention may be directly mounted in an expansion valve 30 between a condenser 20 and the expansion valve 30 in an air conditioner system including a compressor 10 configured to compress a refrigerant, the condenser 20 configured to condense a refrigerant, the expansion valve 30 configured to expand the condensed refrigerant, and an evaporator 40 configured to evaporate the refrigerant that is expanded through the expansion valve 30 through heat exchange with air, and exchange heat of a refrigerant, which is an operation fluid that is injected into the inside of the heat exchanger 100 for the vehicle. In particular, the heat exchanger for the vehicle 100 according to an exemplary embodiment of the present invention, as shown in FIG. 1 to FIG. 5, may include a heat exchange unit 110, first and second inflow apertures 118a and 122a, first and second exhaust apertures 118b and 122b, a connection aperture 124, and at least one noise reduction unit.

First, in the heat exchange unit 110, a plurality of first and second plates 112 and 114 that are mutually coupled may be layered and a first flow path 116a and a second flow path 116b may be alternately formed inside. The heat exchange unit 110 may be configured to exchange heat of operation fluids that pass through each of the first and second flow paths 116a and 116b. A first surface of such a heat exchange unit 110 may be connected to the expansion valve 30. The first inflow aperture 118a may be formed at a first side corner portion on a second surface of the heat exchange unit 110 and may be connected to the first flow path 116a. The first exhaust aperture 118b may be formed to correspond to the first inflow aperture 118a at the first surface of the heat exchange unit 110 and may be connected to the first flow path 116a.

Additionally, the connection aperture 124 may be respectively formed at the first and second plates 112 and 114 at the position facing the first inflow aperture 118a and the first exhaust aperture 118b. The connection aperture 124 may be connected to the first flow path 116a inside the heat exchange unit 110 and the connection with the second flow path 116b may be closed. In the present exemplary embodiment, the second inflow aperture 122a may be formed to correspond to the first inflow aperture 118a at a second side corner portion of the heat exchange unit 110 and may be connected to the second flow path 116b.

The second exhaust aperture 122b may be formed at the center of the heat exchange unit 110 and may be connected to the second inflow aperture 122a through the second flow path 116b. Accordingly, by forming movement of an operation fluid that passes through the first and second flow paths 116a and 116b through the first and second inflow apertures 118a and 122a, respectively, into counter flow, the heat exchange unit 110 may be configured to exchange heat. Particularly, the first plate 112 may include a first main body 112a and a first extension part 112b.

At least at least one protrusion 112c that extends inside the first flow path 116a may be formed at a first surface of the first main body 112a. The first main body 112a may be formed as a semi-circular shape and the second exhaust aperture 122b and the connection aperture 124 may be formed in a same shape as the first main body 112a. The first inflow aperture 118a may be formed at the first extension part 112b and extends toward a width direction of the expansion valve 30 from the first main body 112a. The above-configured two first plates 112 are mutually coupled and may form the first flow path 116a inside thereof.

The second plate 114 may include a second main body 114a and a second extension part 114b. At least at least one protrusion 114c that extends inside the second flow path 116b may be formed at a first surface of the second main body 114a. The second main body 114a may be formed as the semi-circular shape. The first and second main body 112a and 114a may be formed of the same shape.

The second inflow aperture 122a may be formed at the second extension part 114b and extends toward the width direction of the expansion valve 30 from the second main body 114a. In particular, the first extension part 112b and the second extension part 114b may extend in the same direction from the first and second main body 112a and 114a and may be positioned to be crossed to each other. In other words, with reference to a drawing, the first extension part 112b may be positioned downward and the second extension part 114b may be positioned upward. The above-configured two second plates 114 may be mutually coupled and the second flow path 116b may be formed inside the plates.

Referring to FIG. 6, a notching aperture 114d may be formed at the position that corresponds to the second exhaust aperture 122b in the second plates 114 mutually coupled to form the second flow path 116b to allow communication between the second flow path 116b and the second exhaust aperture 122b. In other words, the notching aperture 114d may exhaust the operation fluid passing through the second flow path 116b to the second exhaust aperture 122b.

The above-configured first and second plates 112 and 114 may be layered in the state that two sheets are mutually coupled to form the first and second flow paths 116a and 116b, thereby forming the heat exchange unit 110. On the other hand, the protrusions 112c and 114c respectively formed at first and second plates 112 and 114 may adjust a movement flow to uniformly flow over the entire of the first flow path 116a and the second flow path 116b by detouring or guiding operation fluids that pass through each of the first flow path 116a and the second flow path 116b.

In other words, when operation fluids that are injected into each of the first inflow aperture 118a and the second inflow aperture 122a pass through the first flow path 116a and the second flow path 116b, the protrusions 112c and 114c enable the operation fluids to entirely move on each of the flow paths 116a and 116b, thereby increasing a heat exchange area and thus efficiency is improved. Further, the connection aperture 124 may be formed to be separated from the second exhaust aperture 122b on the opposite side of the first and second extension part 112b and 114b in the first and second main body 112a and 114a. This connection aperture 124 may be formed as a rounded slot shape.

Particularly, operation fluids may be formed with a refrigerant of a high temperature and a high pressure that is discharged from the condenser 20 to pass through each of the first flow path 116a through the first inflow aperture 118a, and a refrigerant at a low temperature and a low pressure that is discharged from the evaporator 40 to pass through each of the second flow channels 116b through the second inflow aperture 122a. The heat exchange unit 110 having such a configuration may be formed in a plate shape in which a plurality of the first and second plates 112 and 114 of two sheets are mutually coupled are layered.

In the present exemplary embodiment, the exemplary embodiment in which two flow paths, two inflow apertures, and two exhaust apertures are formed in the heat exchange unit 110 has described, however it is not limited thereto and the number of the flow paths, inflow apertures, and exhaust apertures may be changed based on a number of the operation fluid. For example, when an operation fluid further includes a coolant, by layering a separate plate, a new flow path through which the coolant flows may be formed and an inflow aperture and an exhaust aperture that are connected to the new flow path may be newly formed.

In addition, one or two noise reduction unit may be configured and may be mounted on the first surface or the second surface of the heat exchange unit 110. The noise reduction unit may reduce a noise and a vibration generated from the refrigerant that flows through the second inflow aperture 122a and the second exhaust aperture 122b. In particular, the noise reduction unit may include a first noise reduction unit 160 mounted on the second surface of the heat exchange unit 110 and a second noise reduction unit 170 mounted on the first surface of the heat exchange unit 110. The first and second noise reduction units 160 and 170 may be mounted on both sides of the heat exchange unit 110, or only one of the first and second noise reduction units 160 and 170 may be mounted on the heat exchange unit 110.

First, the first noise reduction unit 160 may include a muffler body 162 configured of a center part 164 and first and second mounting parts 166 and 168. The center part 164 may be disposed on the center based on the length direction of the muffler body 162. Additionally, the first and second mounting parts 166 and 168 may have a diameter that is less than the diameter of the center part 162 from the center part 160 to both side ends and may be formed as a conical shape. A mounting plate 161 formed of the same external shape as the shape of the heat exchanger 110 may be mounted on the first mounting part 166 using a coking or brazing welding.

Further, the mounting plate 161 may be mounted on the second surface of the heat exchange unit 110 through the brazing welding and thus, the first mounting part 166 may be connected to the second exhaust aperture 122a. Accordingly, the mounting plate 161 may be closed and sealed with the heat exchange unit 110 and may prevent a leakage of the refrigerant from the second exhaust aperture 122b. A penetration aperture 161a may be formed to correspond to the first inflow aperture 118a in the mounting plate 161. Accordingly, the refrigerant supplied from the condenser 20 may flow into the first inflow aperture 118a through the penetration aperture 161a.

Additionally, a pipe block 169 used to mount a connection pipe (not shown) may be respectively mounted on the second mounting part 168 and the penetration aperture 161a. As the pipe blocks 169 may connect connection pipes when connecting the compressor 10 or the evaporator 20 to the heat exchanger 100, a function improving a pipe connection workability and decreasing a pipe installation time may be achieved. The noise reduction unit 150 having such a configuration may be formed in an expansion muffler that reflects noise and vibration occurring while a refrigerant of a low temperature and a low pressure moves through the first mounting part 166 having a smaller cross-sectional area than the inner cross-sectional area of the center part 164 using a change of a cross-sectional area.

Figure 7:
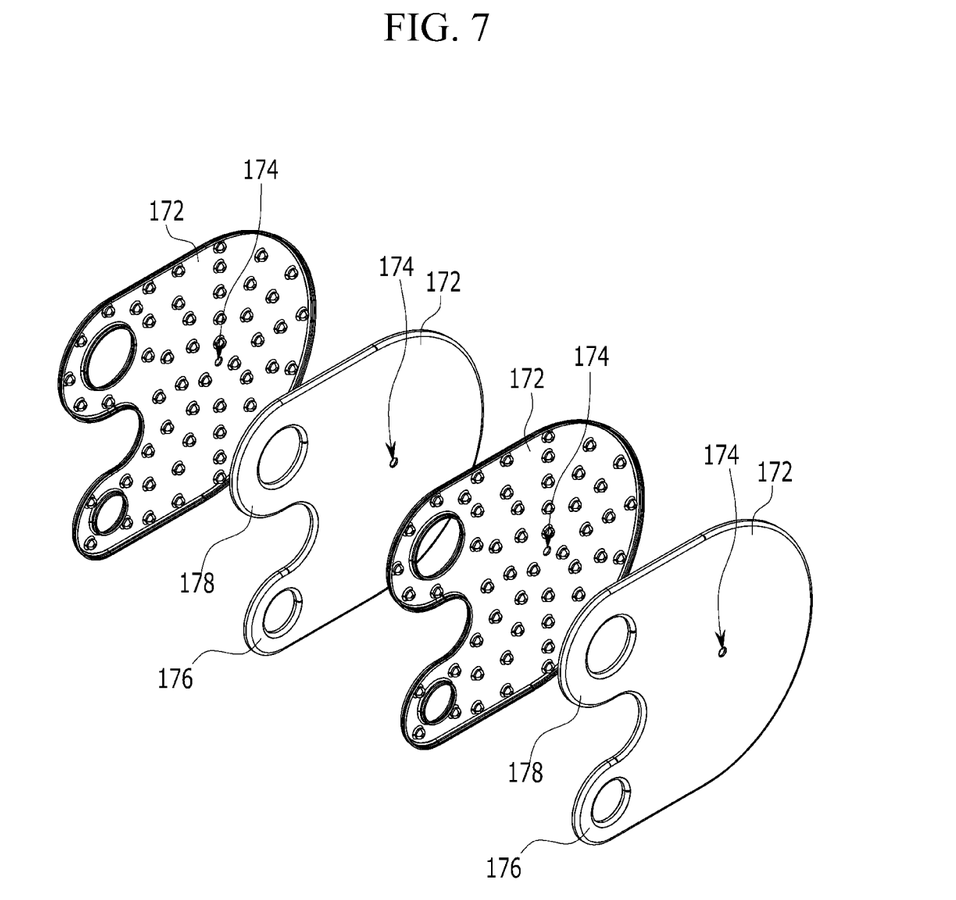
FIG. 7 is a detailed perspective view of a second noise reduction unit applied to a heat exchanger for a vehicle according to an exemplary embodiment of the present invention.

FIG. 7 is a detailed perspective view of a second noise reduction unit applied to a heat exchanger for a vehicle according to an exemplary embodiment of the present invention. Referring to FIG. 7, the second noise reduction unit 170 may include a noise reduction plate 172 of at least two sheets and a resonance aperture 174.

First, the noise reduction plate 172 may be configured of two sheets and are mutually coupled and forms a space S inside. The number of these noise reduction plates 172 may be configured of an even number, and the present exemplary embodiment is composed of four sheets to form the space S inside and two sheets are mutually coupled. Particularly, the first and second protruded parts 176 and 178 corresponding to the first and second inflow apertures 118a and 122a may be integrally formed in the noise reduction plate 172. Accordingly, the second noise reduction unit 170 may be formed of the same external shape as the heat exchange unit 110 and may be mounted to the heat exchange unit 110 using the brazing welding.

In the present exemplary embodiment, the resonance aperture 176 may be formed to correspond to the second exhaust aperture 122b at the center of the first and second noise reduction plates 172 and 174 and may be connected to the space S. The space S may close the connection to the first flow path 116a, the first inflow aperture 118a, and the first exhaust aperture 118b to inject only the refrigerant that is exhausted to the second exhaust aperture 122b through the resonance aperture 176 after flowing into the second inflow aperture 122a and passing through the second flow paths 116b.

In the second noise reduction unit 170 having such a configuration, when the refrigerant of the low temperature and the low pressure having passed through the second flow path 116b through the second exhaust aperture 122b is discharged, the refrigerant of the low temperature and the low pressure discharged from the second exhaust aperture 122b may flow into the space S through the resonance aperture 174. Therefore, while the refrigerant of the low temperature and the low pressure inflows to the space S through the resonance aperture 174, the refrigerant generates an inverse frequency of noise and vibration frequency occurring when the refrigerant moves.

Such an inverse frequency offsets a standing wave by movement noise and vibration that is generated in a refrigerant of a low temperature and a low pressure while being discharged through the second exhaust aperture 122b, and thus vibration and noise of the refrigerant that is generated while the refrigerant of a low temperature and a low pressure moves may be reduced. In other words, the second noise reduction unit 170 having the foregoing configuration performs a function of a resonance type of muffler, and while a standing wave by noise and vibration occurring while a fluid moves along a moving path is injected into a closed and sealed space that is connected through a small inlet or aperture that is formed on a moving path, noise and vibration that are inverted with respect to the standing wave occurs, and the inverse wave offsets noise of a specific frequency band (generally a high frequency area) of the standing wave and thus noise and vibration occurring when a fluid moves may be reduced.

In other words, the second noise reduction unit 170 may operate as a resonance type of muffler using a Helmholtz resonator in which inverse noise and vibration occurs while passing through a closed and sealed space that is connected through a small inlet or aperture. Accordingly, as such a first and second noise reduction unit 160 and 170 is integrally formed in the heat exchange unit 110, a separate muffler may be eliminated and setting a long air conditioner pipe may be omitted to reduce noise and vibration occurring when a refrigerant moves.

On the other hand, in the present exemplary embodiment, a connection plate 130 may be mounted on the expansion valve 30 through a fixing bolt B. Particularly, a seal ring 132 may be interposed between the connection plate 130 and the expansion valve 30 to prevent the leakage of the refrigerant that flows in from the heat exchange unit 110 to the expansion valve 30, or flows in from the expansion valve 30 to the heat exchange unit 110. Additionally, the heat exchange unit 110 or the second noise reduction unit 170 may be mounted on the connection plate 130 using the coking and brazing welding in the on opposite direction of the expansion valve 30. Accordingly, the heat exchange unit 110 is directly mounted on the expansion valve 30 through the connection plate 130 or is mounted through the second noise reduction unit 170 mounted on the connection plate 130, thereby being integrally configured with the expansion valve 30.

Figure 8:
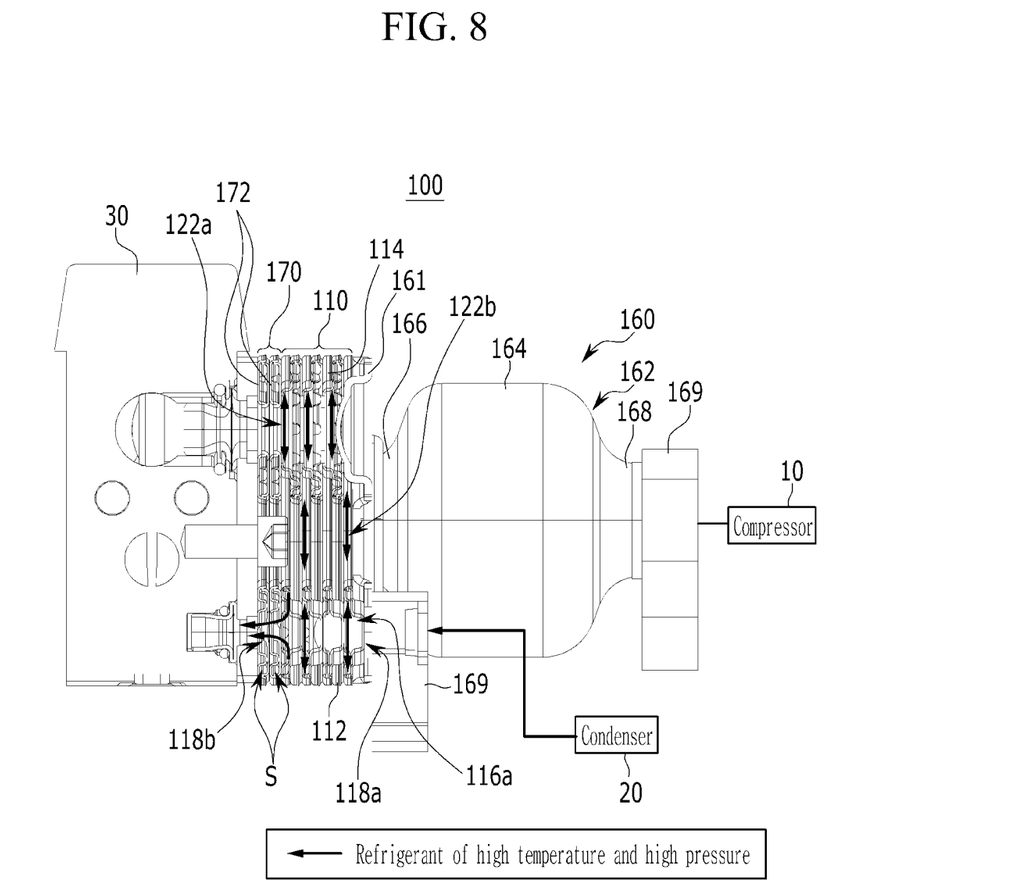
FIG. 8 is a cross-sectional view taken along line A-A of FIG. 2 showing a moving state of a refrigerant exhausted from a condenser according to an exemplary embodiment of the present invention.

Hereinafter, an operation of the heat exchanger 100 for the vehicle according to an exemplary embodiment of the present invention having the foregoing configuration will be described in detail. FIG. 8 is a cross-sectional view taken along line A-A of FIG. 2 showing a moving state of a refrigerant exhausted from a condenser, and FIG. 9 is a cross-sectional view taken along line B-B of FIG. 2 showing a moving state of a refrigerant exhausted from an evaporator.

First, the refrigerant of the high temperature and the high pressure that is condensed in the condenser 20 flows into the first inflow aperture 118a as shown in FIG. 8. The refrigerant that flows into the first inflow aperture 118a passes through each of the first flow paths 116a through the connection apertures 124 and then is discharged to the expansion valve 30 through the first exhaust aperture 118b. In particular, the refrigerant of the high temperature and the high pressure that flows into the heat exchange unit 110 exchanges heat with the refrigerant of the low temperature and the low pressure passing through each of the second flow paths 114b.

Figure 9:
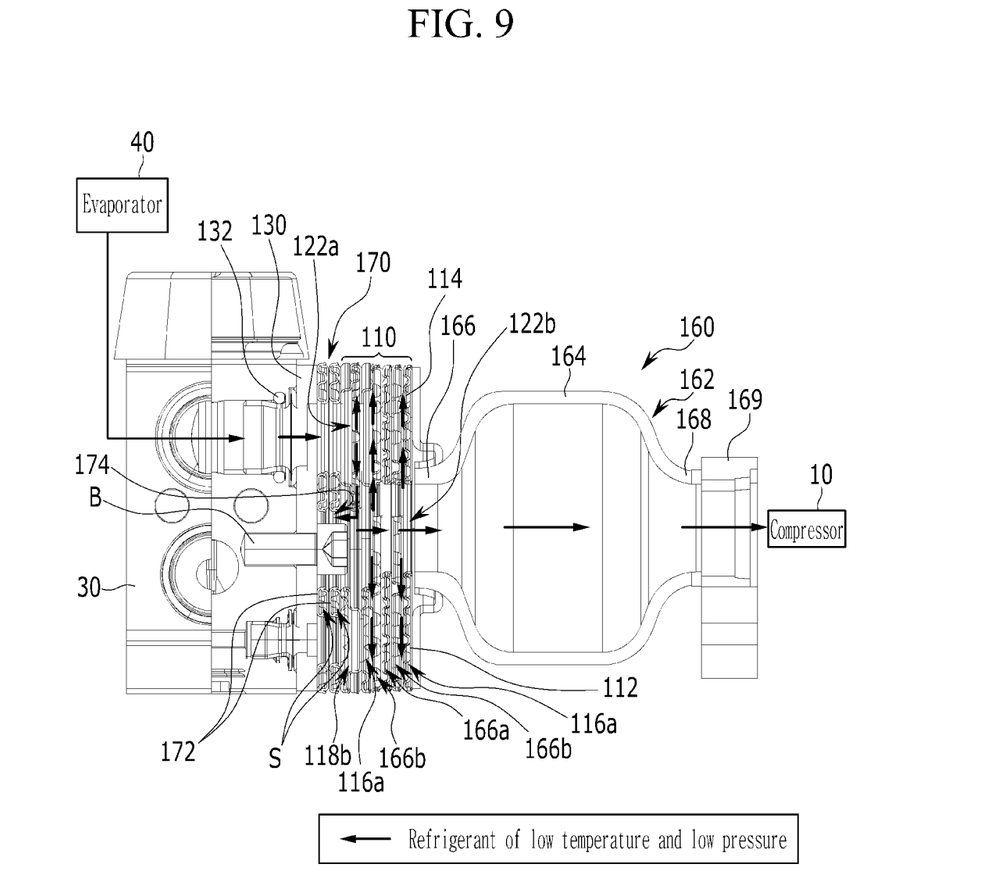
FIG. 9 is a cross-sectional view taken along line B-B of FIG. 2 showing a moving state of a refrigerant exhausted from an evaporator according to an exemplary embodiment of the present invention.

Additionally, the refrigerant of the low temperature and the low pressure exhausted from the evaporator 40, as shown in FIG. 9, flows in through the second inflow aperture 122a to flow into each second flow path 116b. In particular, the refrigerant of the low temperature and the low pressure flows into the resonance aperture 174 of the second noise reduction unit 170 from the second exhaust aperture 122b positioned adjacent to the second noise reduction unit 170. The refrigerant of the low temperature and the low pressure generates inverse noise and vibration of a standing wave by noise and vibration occurring when a refrigerant moves while passing through the space S that is connected through the resonance aperture 174.

Such an inverse wave offsets noise of a specific frequency band (generally a high frequency area) of a standing wave that is generated when the refrigerant of the low temperature and the low pressure moves, and thus the refrigerant of the low temperature and the low pressure firstly reduces noise and vibration occurring while passing through the second exhaust aperture 218b. Then, the refrigerant of the low temperature and the low pressure exchanges heat with the refrigerant of the high temperature and the high pressure passing through the first flow paths 116a while passing through each the second flow paths 116b. The refrigerant of the low temperature and the low pressure passing through the second flow path 116b may be exhausted to the second exhaust aperture 122b through the notching aperture 114d.

Accordingly, the refrigerant of the low temperature and the low pressure may pass through the first mounting part 166 connected to the second exhaust aperture 122*b* and flows into the center part 164 of the muffler body 162 in the opposite direction of the expansion valve 30. Particularly, the refrigerant of the low temperature and the low pressure passing through the first mounting part 166 moves from the first mounting part 166 having the relatively small cross-section to the center part 164 having the large cross-section. The muffler body 162 may operate as the expansion muffler by using the cross-section change inside the first mounting part 166 and the center part 164, and thus, noise and vibration generated from the refrigerant of the low temperature and the low pressure exhausted through the second exhaust aperture 114*b* may be offset and reduced.

Further, the refrigerant of the low temperature and the low pressure passing through the first noise reduction unit 160 may be exhausted to the compressor 10. In other words, in the present exemplary embodiment, noise and vibration may be firstly offset in the second noise reduction unit 170 and then the refrigerant of the low temperature and the low pressure supplied from the evaporator 40 may pass through the heat exchange unit 110. While the refrigerant of the low temperature and the low pressure exhausted from the heat exchange unit 110 passes through the first noise reduction unit 160, noise and vibration may be secondly offset and reduced.

As above-described, as the heat exchanger for the vehicle 100 according to an exemplary embodiment of the present invention respectively configures the first and second noise reduction units 160 and 170 in integral on both sides of the heat exchange unit 110 and is directly mounted on the expansion valve 30, a modulation may be planned and noise and vibration generated during the movement of the refrigerant may be reduced.

Further, the heat exchange unit 110 super-cools the refrigerant of the high temperature and the high pressure with the refrigerant of the low temperature and the low pressure through heat exchange, thus, a non-condensable refrigerant that is included in the refrigerant of a high temperature and a high pressure may be injected into the expansion valve 30 in a condensed state through heat exchange. Accordingly, the heat exchanger 100 additionally decreases a temperature of a refrigerant of the inlet side of the evaporator 40 and generates a substantial enthalpy difference of the evaporator 40, thereby maximizing a Coefficient Of Performance (COP).

The heat exchanger 100 according to the present exemplary embodiment also prevents efficiency of an air conditioner system from being deteriorated by a non-condensable gas refrigerant, thereby increasing expansion efficiency in the expansion valve 30. When describing the heat exchanger for the vehicle 100 according to an exemplary embodiment of the present invention, the exemplary embodiment to which the first and second noise reduction units 160 and 170 are all applied, however it is not limited thereto and the first noise reduction unit 160 may be only applied.

Therefore, when the vehicle heat exchanger 100 having the above-described configuration according to an exemplary embodiment of the present invention is applied, the heat exchange unit 110 may be integrally mounted on the expansion valve 30 and super-cools the refrigerant of the high temperature and the high pressure supplied from the condenser 20 with the refrigerant of the low temperature and the low pressure supplied from the evaporator 40 to the compressor 10 through mutual heat exchange, thereby improving air conditioning performance of an air conditioner system and simplifying refrigerant flow, and thus occurrence of pressure drop within a condenser inlet and outlet pipe may be reduced.

Additionally, by super-cooling a refrigerant and supplying the refrigerant to the evaporator 40, a refrigerant temperature of the inlet side of the evaporator 40 may be additionally decreased and an enthalpy difference of the evaporator 40 may be generated and thus a COP, which is a coefficient of an air conditioning ability to consume power of the compressor 10 may be maximized, and thus compared with a conventional case, an air conditioning performance and air conditioning efficiency of an entire air conditioner system may be improved.

By reducing noise and vibration from occurring when the refrigerant moves by integrally forming the first and second noise reduction units 160 and 170, noise and vibration may be prevented from being transferred to a vehicle interior, and an entire NVH performance of a vehicle may be improved to thus improve a driving impression and entire marketability of a vehicle. By forming the heat exchange unit 110 in a module by integrally forming is in the expansion valve 30 and by removing a separately mounted muffler, constituent elements may be formed in a simplified manner and thus a production cost may be reduced. By simplifying a layout within a small engine compartment by reducing a length of an air conditioner pipe, space use may be improved.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A heat exchanger for a vehicle, comprising:
a heat exchange unit in which a plurality of first and second plates are alternately layered to alternately form a first flow path and a second flow path inside, wherein operation fluids each pass through the first and second flow paths, respectively, and exchange heat and a first surface of the heat exchange unit is connected to an expansion valve;
a first inflow aperture formed at a first side corner portion on a second surface of the heat exchange unit and connected to the first flow path;
a first exhaust aperture formed to correspond to the first inflow aperture on the first surface of the heat exchange unit and connected to the first flow path;
connection apertures respectively formed in the first and second plate at positions facing the first inflow aperture and the first exhaust aperture, connected to the first flow path inside the heat exchange unit, and closing a connection to the second flow path;
a second inflow aperture formed to correspond to the first inflow aperture at a second side corner portion of the heat exchange unit and connected to the second flow path; and
a second exhaust aperture formed at a center of the heat exchange unit and connected to the second inflow aperture through the second flow path,
wherein at least one noise reduction device configured to reduce noise and vibration generated from an operation fluid moving through the second inflow aperture and the second exhaust aperture is mounted to the first surface or the second surface of the heat exchange unit,
wherein the first plate includes:

a first main body in which at least one protrusion that extends inside the first flow path is formed on a first surface of the first main body; and a first extension part having the first inflow aperture and formed extending toward a width direction of the expansion valve from the first main body, and wherein the second plate includes:

a second main body in which at least one protrusion that extends inside the second flow path is formed on a first surface of the second main body; and a second extension part having the second inflow aperture and formed extending toward the width direction of the expansion valve from the second main body, wherein a notching aperture is formed at a position that corresponds to the second exhaust aperture at the second plate mutually coupled to form the second flow path to provide communication between the second flow path and the second exhaust aperture.

2. The heat exchanger for the vehicle of claim 1, wherein the first extension part and the second extension part respectively extend from the first and second main body and are positioned to cross each other.

3. The heat exchanger for the vehicle of claim 1, wherein the connection apertures are formed to be separated from the second exhaust aperture at an opposite side of the first and second extension part on the first and second main body.

4. The heat exchanger for the vehicle of claim 1, wherein the noise reduction device includes:

a first noise reduction device mounted at the second surface of the heat exchange unit, wherein the first noise reduction device includes a muffler body in which a center part is formed of a cylindrical shape with reference to a length direction, and first and second mounting parts having a diameter less than a diameter of the center part from the center part toward both ends of the first and second mounting parts are formed of a conical shape.

5. The heat exchanger for the vehicle of claim 4, wherein a mounting plate formed in a same external shape as a shape of the heat exchanger is mounted on the first mounting part through welding.

6. The heat exchanger for the vehicle of claim 5, wherein the mounting plate is mounted on the second surface of the heat exchange unit through welding to connect the first mounting part to the second exhaust aperture.

7. The heat exchanger for the vehicle of claim 5, wherein a penetration aperture that corresponds to the first inflow aperture is formed in the mounting plate.

8. The heat exchanger for the vehicle of claim 7, wherein a pipe block used to mount a connection pipe is respectively formed on the second mounting part and the penetration aperture.

9. The heat exchanger for the vehicle of claim 4, wherein the first noise reduction device is an expansion muffler.

10. The heat exchanger for the vehicle of claim 4, wherein the noise reduction device includes:

a second noise reduction device mounted between the expansion valve and the heat exchange unit, wherein the second noise reduction device includes a noise reduction plate configured of at least two sheets to be mutually coupled and forming a space inside; and a resonance aperture formed to correspond to the second exhaust aperture on the center of the noise reduction plate and connected to the space.

11. The heat exchanger for the vehicle of claim 10, wherein first and second protruded parts are integrally formed to correspond to the first and second inflow apertures at the noise reduction plate.

12. The heat exchanger for the vehicle of claim 10, wherein the second noise reduction device is formed in a same external shape as a shape of the heat exchange unit and is mounted on the heat exchange unit through welding.

13. The heat exchanger for the vehicle of claim 10, wherein the space closes a connection to the first flow path, the first inflow aperture, and the first exhaust aperture and thus an operation fluid exhausted to the second exhaust aperture after flowing into the second inflow aperture and passing through the second flow paths only flows through the resonance aperture.

14. The heat exchanger for the vehicle of claim 5, wherein the noise reduction device includes a second noise reduction device and the second noise reduction device is a resonance muffler.

15. The heat exchanger for the vehicle of claim 1, wherein a connection plate is mounted on the expansion valve by a fixing bolt.

16. The heat exchanger for the vehicle of claim 15, wherein a seal ring is interposed between the connection plate and the expansion valve to prevent a leakage of the operation fluids that flow into the expansion valve from the heat exchange unit or flow into the heat exchange unit from the expansion valve.

17. The heat exchanger for the vehicle of claim 15, wherein the heat exchange unit or the noise reduction device is mounted on the connection plate through welding in an opposite direction of the expansion valve.

18. The heat exchanger for the vehicle of claim 1, wherein the operation fluids include a refrigerant of a high temperature and a high pressure that is discharged from a condenser to pass through the first flow path through the first inflow aperture, and a refrigerant of a low temperature and a low pressure that is discharged from an evaporator to pass through the second flow path through the second inflow aperture.

* * * * *